United States Patent [19]

Goans

[11] Patent Number: 4,790,354
[45] Date of Patent: Dec. 13, 1988

[54] MANUAL RELAY VALVE

[76] Inventor: Kip B. Goans, P.O. Box 1708, Gretna, La. 70053

[21] Appl. No.: 112,455

[22] Filed: Oct. 26, 1987

[51] Int. Cl.$^4$ .......................................... F19B 13/042
[52] U.S. Cl. ................................ 137/625.66; 137/269
[58] Field of Search ............................ 137/269, 625.66

[56] References Cited

U.S. PATENT DOCUMENTS

| | | |
|---|---|---|
| 3,621,881 | 11/1971 | Vicari . |
| 3,877,484 | 4/1975 | Theriot et al. . |
| 3,963,050 | 6/1976 | Theriot et al. . |
| 3,996,965 | 12/1976 | Peters . |
| 4,304,253 | 12/1981 | Roger . |
| 4,420,011 | 12/1983 | Roger . |
| 4,625,764 | 12/1986 | Snyder et al. .................. 137/625.66 |
| 4,709,727 | 12/1987 | Gober ............................ 137/625.66 |

OTHER PUBLICATIONS

Ruelco Spec Sheet 100-9-84 (MP-1 Relay).
Ruelco Spec Sheet 410-02-5 (SS-1 Pressure Sensor).

Primary Examiner—Gerald A. Michalsky
Attorney, Agent, or Firm—Hubbard, Thurman, Turner & Tucker

[57] ABSTRACT

A three-way normally closed relay valve is provided for selectively effecting a control action in response to pressure of a pilot fluid. A tubular valve body defines a central valve chamber for housing a valve member manually manipulatable into a relay open position for initiating service. A lower piston affixed to the end of the valve member is subjected to pilot fluid pressure, and moves the valve member axially for controlling the flow of fluid between inlet, outlet, and vent ports in the valve body. An orifice in the piston intermittently establishes communication between a pilot pressure inlet port and a chamber within the valve body. The restricted orifice cooperates with a fixed seal to trap pilot pressure above and below the piston as the movable piston passes the fixed seal toward the relay closed position, and thereby prevents the valve member from moving in response to pilot pressure. A subassembly having a threaded connection for sealing engagement with the pilot inlet port is provided for economically adding to or removing from the valve body a relay opening capability in response to a remote fluid pressure and irrespective of pilot fluid pressure. The desired features of a manually responsive, three-way normally closed relay are thus obtained, although the closed relay can be opened without manual intervention by the application of remote fluid pressure.

20 Claims, 1 Drawing Sheet

MANUAL RELAY VALVE

FIELD OF THE INVENTION

The present invention relates to valves for applying or removing a control pressure to a fluid pressure actuator and, more particularly, relates to an improved three-way normally closed manual relay which may be opened either in response to manual intervention or the application of remote fluid pressure.

BACKGROUND OF THE INVENTION

Pilot valves for sensing a fluid pressure and shifting a valve element in response thereto have been widely employed in the prior art. A common form of such a valve is the "block and bleed" type, which employs a pressure balanced spool valve which is shiftable in response to a change in a monitored fluid pressure to apply or exhaust a control pressure, so that an actuator is controllably responsive to the monitored fluid pressure. The spool valve is normally urged to one position by a spring whose force is opposed to the monitored fluid pressure, with the spring acting on a piston operatively connected to the spool valve. This type of pilot valve is shown, for example, 1 in U.S. Pat. 4,420,011 to Roger.

Manually manipulatable pneumatic or hydraulic threeway normally closed relay valves are well known in the art. Such a relay may typically be used to control the fluid pressure to an actuator of a flow control valve, and includes a control inlet port, an outlet port, and a vent port. Control pressure is either passed from the control inlet port to the outlet port and thus the actuator, or is blocked to the vented outlet port, depending on the axial position of a valve member. The valve member is movably responsive to pilot signal pressure to the relay valve generally input via a lower pilot port, while manual intervention of the relay is obtained from an upper control knob movable with the valve member.

Normally there is a sufficient pilot signal pressure to the relay valve to overcome a spring and keep the relay open, thus transmitting control pressure from the inlet port to the outlet port. If the pilot signal pressure to the relay is between the inlet port and the outlet port. The relay thereafter stays closed, regardless of a change in the pilot signal pressure, until the operator manually reopens the relay, at which time the presence of a sufficient pilot signal pressure keeps the relay open. This type of relay is disclosed, for example, in U.S. Pat. No. 3,877,484, which is hereby incorporated by reference.

Such prior art relay valves typically require a multiple diameter bore within the relay body to control sealing engagement between a seal on the piston and the valve body. To keep the relay closed, the pilot signal port is blocked, typically by a metal-to-metal seal, so that this pressure is not acting upon the piston. Should this metal-to-metal seal leak, a gap around the seal is intended to permit the leaked fluid to bypass to the vent port. One disadvantage of this technique concerns relay reliability when the valve stem is intermediate between the relay open and relay closed positions. In this intermediate position, fluid communication is intended between the pilot signal port and the vent port, so that pilot signal pressure is bled to the atmosphere. When more than one relay is utilized with the same pilot pressure signal, this escape of fluid when one relay is in the intermediate position could result in a sufficient decrease in pilot signal pressure to inadvertently close other relays intended to be held open by the pilot signal pressure.

Another disadvantage of the above relay is that the pilot signal pressure still acts on a relay which is closed, and may be sufficient to inadvertently open the relay (thereby creating significant safety concerns) should other components of the relay fail. For example, if the relay is mounted "upside down" and the piston return spring were to fail, the return of a high pilot signal pressure acting upon the piston projection blocking at the pilot signal port could inadvertently reopen the relay. Even though this pilot signal pressure subsequently bypasses the piston and is vented, a pressure differential across the piston could still open the relay.

A desirable feature of a three-way relay as described above is that, once the relay closes due to a lack of pilot pressure, the relay cannot be reopened by the mere presence of pilot pressure. Typically, the pneumatic or hydraulic logic system utilized intends that operator intervention, normally applied by pulling up on the valve member, be required to reopen the relay, and further requires that the pilot fluid pressure be maintained at a sufficient level to keep the relay open. Under certain circumstances, however, it is not desirable to allow the relay to be opened only by manual intervention. In the case of an offshore oilwell, for instance, a relay of the type described above is normally desired, but after an emergency storm situation, it may be desirable to open the relay without requiring the time and expense normally associated with operator involvement to manually open a remotely positioned relay, which may be in an offshore or other remote environment.

The disadvantages of the prior art are overcome by the present invention, and an improved manual relay valve is hereinafter described.

SUMMARY OF THE INVENTION

The invention provides a valve body having a central chamber within which a valve member is axially shiftable between a first and a second position. Axially spaced, radially disposed fluid ports are provided in the valve body to permit the selective supply of control fluid through an inlet port to an outlet port, and the utilization of another port as a vent. Pilot pressure is input by a lower port to act upon a piston attached to the valve member for moving the valve member to the relay open position. A knob secured to the top end of the valve member may be used to manually pull the valve to the relay open position. Bolt or pin means are provided which are accessible to the the exterior of the valve body and transverse to the valve body to project into the path of movement of the valve member.

An orifice is provided through the side wall of the piston and between the pilot pressure inlet port and a chamber between the piston and the vent port, the piston being movable axially such that the orifice passes a fixed seal when the valve member is moving to the relay closed position, which thereafter prevents piston movement in response to pilot pressure. When the relay is in the closed position, the orifice thus places the chamber in fluid communication with the pilot signal pressure. When the valve member is in an intermediate position, the chamber is sealed from both the vent port and the pilot pressure inlet port, while the chamber is vented to atmosphere when the valve member is fully in the relay open position. Fluid communication between the pilot signal port and the vent port is precluded regardless of the position of the valve stem, so that the previously described disadvantage relating to loss of pilot signal pressure to multiple relays connected to the same pilot signal source is avoided. Also, when the relay is in the closed position, pilot signal pressure has no affect on the piston, and relay reliability is thus enhanced.

The subassembly has a threaded male end for facilitating selective engagement in the field with the pilot signal port of the valve body. The subassembly permits normal operation of the three-way, normally closed manual relay, but also enables the relay to be moved to the open position due to a remote fluid pressure and without manual intervention. The subassembly comprises a body having a pilot pressure inlet port, a remote pressure inlet port, a piston movable axially in response to remote fluid pressure, and a valve stem for physical engagement with the valve member in the valve body for opening the relay.

The present invention thus provides a three-way normally closed manual relay valve which does not block the pilot signal port during any phase of its operation. The cost of the valve is reduced since a dual diameter passageway through the valve body is not required for controlling sealed engagement between the piston and the valve body.

As one technique for operating the relay, a remote fluid pressure may be forwarded to the subassembly remote fluid inlet port of the relay for automatically opening the relay, and thus for transmitting control pressure through the relay. Manufacturing costs are reduced by providing the subassembly as a component which may be easily and quickly added to or removed from the valve body in field operations.

These and additional features and advantages of the present invention will become apparent to those skilled in the art from the following detailed description, wherein reference is made to the figures in the accompanying drawings.

DETAILED DESCRIPTION OF PREFERRED EMBODIMENTS

Figures 1, 2, 3:
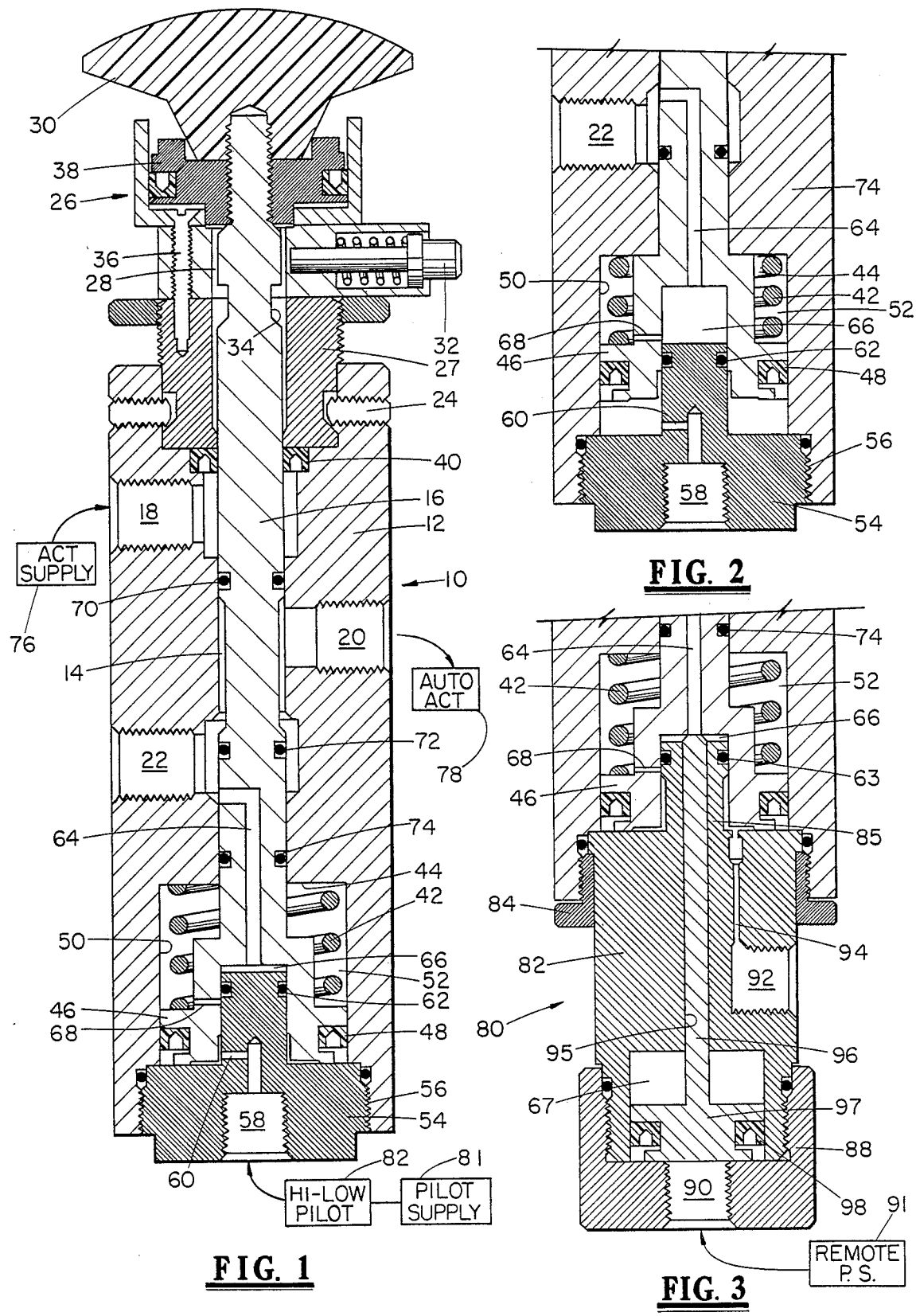
FIG. 1 is a vertical pictorial view, partially in cross-section, through the relay valve of the present invention positioned within a schematically illustrated system.
FIG. 2 is a cross-sectional view of a portion of the relay shown in FIG. 1 shifted to the relay open position.
FIG. 3 is a cross-sectional view illustrating the subassembly of the present invention secured to the lower end of the relay shown in FIG. 1.

A relay valve 10 embodying this invention comprises a generally tubular valve body 12 defining a central, cylindrical valving chamber 14 for receiving a valve stem or valve member 16. Three ports, a control pressure inlet port 18, a control pressure outlet port 20, and a vent port 22, are provided for selective fluid transmission, as explained subsequently. Each of the ports 18, 20 and 22 is provided in an axially-spaced relationship in the valve body 12, and preferably ports 18 and 20 are radially disposed, as are ports 20 and 22.

The top end of valve body 12 is provided with a plurality of conventional threaded Allen screws 24 for securing upper subassembly 26 to the valve body. Subassembly 26 allows for manual operation of the valve member 16, and comprises body 27 having an axial passageway 28 for receiving a portion of the valve member, a knob or handle 30 preferably connected to the upper end of 16, a spring biased pin or bolt subassembly 32 for engagement with recess surface 34 in member 16 for limiting downward axial movement of the valve member, and bolt 36 for securing the upper sealing member 38 and subassembly 32 to body 27. The valve stem 16 and body 12 remain in sealed engagement as the stem 16 axially moves due to U-cup annular seal 40.

Valve member 16 is biased downwardly, as viewed in the drawings, by a compression spring 42 which is mounted between the planar surface 44 of body 12 and piston 46 secured to and thus axially movable with valve member 16. A U-cup annular seal 48 on the piston remains in sealed engagement with the uniform diameter cylindrical wall 50 of expanded chamber 52.

Lower plug body 54 is sealingly threaded to body 12 at 56, and includes a threaded pilot signal port 58 and one or more radially directed passageways 60 for continually providing pilot signal pressure to the lower surface of piston 46. Plug body 54 is also provided with an O-ring seal 62 which continually prevents pilot signal pressure from passing through passageway 64 within the valve member 16 to the vent port 22. Chamber 66 between the valve member and the plug body 54 thus continually remains at atmospheric pressure.

A restricted diameter passageway 68 is provided through the side wall of piston 46 for cooperation with seal 62 and thereby selectively controlling fluid communication between the interior cavity 52 and pilot pressure inlet port 58.

When the valve member 16 is in its upper position, O-ring seal 70 on the valve stem is not in sealed engagement with the body 12, and accordingly inlet port 18 is in fluid connection with outlet port 20, while O-ring seal 72 seals outlet port from vent port 22. At this time, O-ring seal 74 is out of sealed engagement with body 12, and orifice or passageway 68 is above seal 62 so that both chambers 52 and 66 are vented to atmosphere, while the lower end of piston 46 is subjected to pilot pressure.

When relay 10 is in its closed position, port 18 is blocked by seal 70 from communication with port 20, which is vented to atmosphere since seal 72 is out of engagement with body 12. Passageway 68 is below seal 62, and accordingly chamber 52 is in communication with pilot signal pressure and is sealed by seals 62 and 74, while chamber 66 remains at atmospheric pressure. Seals 62 and 74 engage equal diameter cylindrical surfaces on piston 46 and body 12, respectively, and accordingly the upper and lower faces of the piston, which are equal in area, are subjected to the same pressure, such that pilot signal pressure produces no axial force on the valve member at this time.

Valve 10 may typically be a part of a pneumatic or hydraulic logic circuit which includes an actuator supply 76 for passing control pressure to inlet port 18, and an automatic actuator 78 in fluid communication with port 20. Actuator 78 may be any of a number of commercially available, fluid controlled automatic actuators, and for representative purposes will be described in the environment of an offshore oil and gas well for opening or closing the well in response to control pressure being "on"0 or "off" to the actuator by operation of the relay valve 10.

A pilot pressure source 81 supplies pressure to port 58, and may pass through a conventional high-low pilot valve 82. Sufficient pilot pressure at port 58 thus moves the valve stem 16 up to the open relay position, while the absence of pilot fluid pressure allows biasing means 42 to automatically close the relay. In operation, the relay 10 is generally open and is held open by the presence of pilot pressure at port 58 acting on the lower surface of piston 46 and overcoming the biasing force of spring 42. Ports 18 and 20 are thus in communication, and seal 72 blocks port 20 from port 22. Seal 74 is out of engagement with body 12 (as shown in FIG. 2) and accordingly, chambers 52 and 66, and thus the top of piston 46, are subjected to atmospheric pressure.

Once the relay closes in response to the lack of sufficient pilot pressure, the relay (normally) stays in the closed position. When closed, passageway 68 subjects cavity 52 to pilot pressure, which is acting on both sides of piston 46 having equal opposing area surfaces. Accordingly, the relay valve stays closed regardless of an increase or decrease in signal pressure. High-low pilot 82, if desired, may be provided for passing only a selected and controllable range of pressure signals to port 58.

Once closed, the relay 10 may be brought back "into service" by manual intervention. By pulling up on handle 30, the relay may be brought to the "open" position, and temporarily held in that position (spring 42 not being able to move the valve member downwardly) by pin assembly 32 engaging recess surface 34 in the valve member. Thereafter, the application of sufficient pilot pressure at port 58 will cause the piston 48 to move slightly upwardly (passageway 68 is above O-ring 62), allowing the pin assembly 32 to return to its inactive position out of engagement with the valve member 16. The relay is thus "in service", so that pilot pressure at port 58 will keep the relay open, while the absence of pilot pressure will automatically cause the relay to close and remained closed until it is manually reopened.

Those skilled in the art appreciate that the pilot port 58 may be in fluid communication with a variety of safety devices, and accordingly the desired control is such that actuator 78 automatically closes should sufficient pilot pressure fail to exist at port 58. The relay, and thus actuator 78, will generally be opened by manual intervention, with appropriate procedures followed to insure continued safety.

To retain the relay 10 in the closed position regardless of the return of pilot signal pressure, passageway 60 is provided in member 54 for maintaining fluid communication between the lower surface of piston 46 and the port 58. Thus no seal exists between port 58 and the lower end of the piston, which is sealed by a conventional U-seal 48 on the cylindrical wall 50. When the relay is in the closed position, pressure in passageway 60 also passes axially upward along the cylindrical inner wall of the piston, and is blocked by seal 62. Pilot pressure is thus passed through passageway 68 to chamber 52, thereby preventing pilot fluid pressure from creating an axial force on the valve member 16. Accordingly, the spring 42 maintains the valve member 16 in the downward position, and the relay is maintained closed. Seals 70 and 72 also sealingly engage the cylindrical inner walls of the body 12, and are equal in diameter, and preferably may be equal to the sealing diameter of seals 74 and 62.

When the relay is in the open position and the pilot signal to port 58 is lost, seal 74 will first engage body 12 as the valve member 16 moves downward. Thereafter, passageway 68 will move past O-ring seal 62. At the point of crossing the O-ring seal 62, passageway 68 is blocked by O-ring 62, and is not reopened until passageway 68 is slightly below 62 as the valve member 16 moves downward. At this point, chamber 52 is subject to pilot fluid pressure, which then exists both above and below the piston 46. Whether the piston signal is rapidly or slowly removed, spring 46 will thus cause the relay to close.

Whether the relay 10 is i its open, closed, or intermediate position, direct fluid communication between the pilot signal port and the vent port is prevented. Accordingly, there is no substantial loss of pilot fluid pressure to other relays connected to the same pilot signal source when one relay is in its intermediate position.

When the relay is in its closed position, pilot signal pressure has no affect on the the piston, since there is no effective piston area upon which pilot signal pressure can act. Reliability and safety of the relay are thus improved, since the closed relay will not inadvertently open in response to the return of pilot signal pressure even if the piston return spring should fail and the relay were mounted upside down from the typical right endup position shown in FIG. 1. Accordingly, the seal 62 is preferably equal to or greater in diameter than seal 74. If seal 62 is slightly greater in diameter than seal 74, it may be seen that any pilot signal pressure to the closed relay will result in an equal pressure force above and below the piston, but the effective piston pressure area on top of the piston will be greater than the piston pressure area on the bottom of the piston, so that pilot signal pressure actually assists in maintaining the relay in the closed position.

Passageway 60 has a diameter which is sized to prevent the valve member 16 from moving to the relay open position should seal 74 leak. In other words, passageway 60 does not allow for the creation of a sufficient pressure differential across seal 48 (when the relay is closed) to overcome the biasing force of spring 42. Valve member 16 will thus not be moved to the up or relay open position even if this seal 74 should slightly leak. The passageway 68 cooperates with the thickness of seal 62 to prevent pilot pressure from passing from the pilot port 58 to the atmospheric chamber 66 below the valve member 16. Of course, seal 74 is not expected to normally leak, and thus normally would remain in sealed engagement with the body 12 regardless of the axial position or movement of valve member 16.

Referring now to FIG. 3, the lower portion of the relay 10 is shown having subassembly 80 affixed thereto. Subassembly 80 includes body 82 and threaded sleeve 84 sized so that tip portion 85 is within the valve body 12 and the interior cavity of piston 46. Subassembly 80 may thus be easily added to and removed from the relay shown in FIG. 1 by a field operation. Components 42, 52, 64, 66, 68 and 74 serve the function previously described. O-ring 63 is positioned on body 82, but is otherwise identical to O-ring 62.

Body 82 is provided with a threaded pilot port 92 preferably sized according to the pilot port 58, so that a line may be disconnected from port 58 and reconnected to port 92. Via passageway 94, port 92 remains in fluid communication with both the lower surface of piston 46 and the O-ring 63, as previously described.

A central passageway 95 in body 82 allows stem 96 and piston 97 affixed thereto to move axially with respect to body 82. A U-seal 98 on piston 97 remains in engagement with the inner cylindrical wall of body 82, so that chamber 67 is in fluid communication with chamber 66 and is thus at atmospheric pressure. End cap 88 is threaded for engagement with body 82, and has a threaded port 94 allowing pressure from a remote source 91 to pass through port 90 and act on the underside of piston 97. Upward movement of piston 97 will thus cause valve stem 16 to move upward to the relay open position, without requiring intervention using the knob 30 as previously described.

If desired, a sufficient signal from remote source 91 may thus be supplied to the relay to open the relay without manual intervention. This feature may be utilized if an operator needs to open the relay, but does not have the time or desire to manually interfere to open the valve as described above. After a storm, for example, it may be desirable to open a closed relay remotely and put the oil or gas well back into production as quickly as possible.

Subassembly 80 thus allows for "bypass" of the manual "return-to-service" aspects of a three-way valve as described above. The introduction of a remote signal to port 90 will thus open the relay (remote signal pressure is presumed sufficient to overcome spring 42) regardless of pilot signal pressure. The relay will, of course, remain open if the remote signal pressure to port 90 is maintained. Once opened, the remote pressure from source 91 may be removed, and the relay will perform as previously described, depending upon the presence or absence of pilot pressure to port 92.

Except for the elastomeric or rubber sealing components, the components described herein may be manufactured from any suitable material, such as metal, intended to withstand the environment in which the relay is placed and the characteristics have a stainless steel construction with an inconel spring and Viton O-rings.

Although the invention has been described in terms of specified embodiments which are set forth in detail, it should be understood that this is by illustration only and that the invention is not necessarily limited thereto since alternative embodiments and operating techniques will become apparent to those skilled in the art in view of the disclosure. Accordingly, modifications are contemplated which can be made without departing from the spirit of the described invention.

What is claimed and desired to be secured by Letters Patent is:

1. A relay valve of the type including a valve body with an elongate bore within the body, a control fluid inlet port, a control fluid outlet port, a vent port, a pilot fluid inlet port, a valve stem slidable within the elongate bore, a knob affixed to the slidable valve stem for manually placing the relay valve in a relay open position, a piston affixed to the valve stem having a pilot fluid pressure surface and an opposing pressure surface, biasing means within the bore for biasing the valve stem in a relay closed position, the valve stem being selectively shiftable in response to pilot fluid pressure from (a) the relay open position establishing fluid communication between the control fluid inlet port and the control fluid outlet port and simultaneously precluding communication between the control fluid outlet port and the vent port, to (b) the relay closed position establishing fluid communication between the control fluid outlet port and the vent port and precluding fluid communication between the control fluid inlet port and the control fluid outlet port, the improvement comprising:
   the piston having a cylindrical interior surface of a uniform diameter between the relay open and relay closed positions of the valve stem;
   the valve body having a cylindrical interior body surface of a uniform diameter between the relay open and relay closed positions of the valve stem, the interior body surface defining a chamber between the piston and the vent port;
   a first sealing means for continued sealing engagement between the interior surface of the piston and the valve body while the valve stem moves between the relay open and relay closed positions;
   a second sealing means for continued sealing engagement with the interior body surface while the valve stem moves between the relay open and relay closed positions;
   a third sealing means for sealing engagement between the valve body and the valve stem to prevent fluid communication between the vent port and the chamber when the valve stem is in the relay closed position, and for permitting fluid communication between the vent port and the chamber when the valve stem is in the relay open position; and
   a fluid passageway means for controllably establishing fluid communication between the chamber and either the pilot pressure port or the vent port depending on the axial position of the fluid passageway means with respect to the first sealing means.

2. The relay valve as defined in claim 1, further comprising:
   the third sealing means is fixed on the valve stem; and
   the first sealing means being equal or greater in diameter than the third sealing means.

3. The relay valve as defined in claim 1, further comprising:
   a flow path through the valve stem for maintaining fluid communication between the vent port and another chamber axially between the valve stem and the first seal means.

4. The relay valve as defined in claim 3, wherein the fluid passageway means provides fluid communication between the chamber and the another chamber when the valve member is in the relay open position.

5. The relay valve as defined in claim 1, wherein:
   the first seal means is an O-ring seal axially affixed to the valve body; and
   the second sealing means is a pressure-responsive seal having a U-shaped cross-sectional configuration and is axially affixed to the piston.

6. The relay valve as defined in claim 5 wherein the fluid passageway means is a cylindrical passageway through the interior piston surface having a uniform diameter and a central axis perpendicular to a central axis of the valve body.

7. The relay valve as defined in claim 6, wherein the first sealing means has a uniform cross-sectional diameter which is greater than the diameter of the fluid passageway means through the interior piston surface.

8. The relay valve as defined in claim 1, further comprising:
   manually manipulatable pin means for temporarily securing the valve stem in a relay open position; and
   biasing means for biasing the pin means to a position out of engagement with the valve stem.

9. The relay valve as defined in claim 1, wherein the pilot fluid pressure surface of the piston exposed to pilot fluid pressure is equal to or less than the opposing surface of the piston exposed to pilot fluid pressure when the relay is in the relay closed position.

10. The relay valve as defined in claim 1, further comprising:

an auxiliary body having a central passageway and having a portion for positioning within the pilot fluid port of the valve body for repeatedly securing and removing the auxiliary body to the valve body;

another pilot fluid port in the auxiliary valve body;

another passageway in the valve body for establishing fluid communication between the piston and the another pilot fluid port;

a remote pressure port in the valve body;

another piston axially movable within the auxiliary body in response to pressure in the remote pressure port; and a valve member affixed to the another piston and axially movable within the central passageway of the auxiliary body for engagement with the valve stem in the valve body, such that the application of pilot fluid pressure to the pilot fluid pressure port enables the auxiliary piston to move the valve stem to the relay open position.

11. A relay valve for controlling pressure from a supply to a pressure responsive actuator in response to a pilot pressure to the relay valve, the relay valve including a valve body having an elongate bore, a control fluid inlet port, a control fluid outlet port, a vent port and pilot pressure inlet port, a valve stem movable within the elongate bore, a piston affixed to the valve stem having a pilot fluid pressure surface and an opposing pressure surface, an interior body surface of the valve body and the piston defining a chamber within the valve body, the valve stem being selectively shiftable in response to pilot fluid pressure from (a) a relay open position establishing fluid communication between a control fluid inlet port and a control fluid outlet port and simultaneously precluding communication between the control fluid outlet port and a vent port, to (b) a relay closed position establishing fluid communication between the control fluid outlet port and the vent port and precluding fluid communication between the control fluid inlet port and the control fluid outlet port, the improvement comprising:

the piston having a cylindrical interior surface of a uniform diameter between the relay open and relay closed positions of the valve stem;

a first sealing means for continued sealing engagement between the interior surface of the piston and the valve body while the valve stem moves between the relay open and relay closed positions and for precluding fluid communication between the pilot pressure inlet port and the vent port when the relay is either in the open position or the closed position;

a second sealing means for sealing engagement between the valve body and the valve stem to prevent fluid communication between the vent port and the chamber when the valve stem is in the relay closed position, and for permitting fluid communication between the vent port and the chamber when the valve stem is in the relay open position; and a fluid passageway means for controllably establishing fluid communication between the interior body surface and either the pilot pressure port or the vent port depending on the axial position of the fluid passageway means with respect to the first sealing means, such that pilot fluid pressure acts upon the opposing pressure surface of the piston to maintain the relay in the closed position when the relay is in the closed position.

12. The relay valve as defined in claim 11, further comprising:

a third sealing means for continued sealing engagement with the interior body surface while the valve stem moves between the relay open and relay closed positions.

13. The relay as defined in claim 11, further comprising:

a flow path through the valve stem for maintaining fluid communication between the vent port and another chamber axially between the valve stem and the first seal means.

14. The relay as defined in claim 11, wherein the pilot fluid pressure surface of the piston exposed to pilot fluid pressure is equal to or less than the opposing surface of the piston exposed to pilot fluid pressure when the relay is in the relay closed position.

15. The relay as defined in claim 11, wherein the fluid passageway means is a cylindrical passageway through the interior surface of the piston and having a uniform diameter, and the first sealing means has a uniform cross-sectional diameter which is greater than the uniform diameter of the fluid passageway through the interior piston surface.

16. The relay as defined in claim 11, further comprising:

an auxiliary body having a central passageway and having a portion for positioning within the pilot fluid port of the valve body for repeatedly securing and removing the auxiliary body to the valve body;

another pilot fluid port in the auxiliary valve body;

another passageway in the valve body for establishing fluid communication between the piston and the another pilot fluid port;

a remote pressure port in the valve body;

another piston axially movable within the auxiliary body in response to pressure in the remote pressure port; and a valve member affixed to the another piston and axially movable within the central passageway of the auxiliary body for engagement with the valve stem in the valve body, such that the application of pilot fluid pressure to the pilot fluid pressure port enables the auxiliary piston to move the valve stem to the relay open position.

17. A relay valve as defined in claim 16, further comprising:

a knob affixed to the slidable valve stem for manually placing the relay valve in a relay open position; and biasing means within the bore for biasing the valve stem in a relay closed position.

18. A relay valve of the type including a valve body with an elongate bore within the body, a control fluid inlet port, a control fluid outlet port, a vent port, a pilot fluid inlet port, a valve stem slidable within the elongate bore, a knob affixed to the slidable valve stem for manually placing the relay valve in the relay open position, a piston affixed to the valve stem having a pilot fluid pressure surface and an opposing pressure surface, biasing means within the bore for biasing the valve stem in a relay closed position, the valve stem being selectively shiftable in response to pilot fluid pressure from (a) the relay open position establishing fluid communication between the control fluid inlet port and the control fluid outlet port and simultaneously precluding communication between the control fluid outlet port and the vent port, to (b) the relay closed position establishing fluid communication between the control fluid outlet port and the vent port and precluding fluid communication between the control fluid inlet port and the control fluid outlet port, the improvement comprising:

the piston having a cylindrical interior piston surface;

the valve body having a cylindrical interior body surface defining a chamber between the piston and the vent port;

a first sealing means for sealing engagement with the interior piston surface while the valve stem moves between the relay open and relay closed positions;

a second sealing means for sealing engagement between the valve body and the valve stem while the valve stem moves between the relay open and relay closed positions and for permitting fluid communication between the vent port and the chamber when the valve stem is in the relay open position;

a fluid passageway through the cylindrical interior position surface for controllably establishing fluid communication between the chamber and either the pilot pressure port or the vent port depending on the axial position of the fluid passageway with respect to the first sealing means;

an auxiliary body having a central passageway and having a portion for positioning within the pilot fluid port of the valve body for repeatedly securing and removing the auxiliary body to the valve body;

another pilot fluid port in the auxiliary valve body;

another passageway in the valve body for establishing fluid communication between the piston and the another pilot fluid port;

a remote pressure port in the valve body;

another piston axially movable within the auxiliary body in response to pressure in the remote pressure port; and a valve member affixed to the another piston and axially movable within the central passageway of the auxiliary body for engagement with the valve stem in the valve body, such that the application of pilot fluid pressure to the pilot fluid pressure port enables the auxiliary piston to move the valve stem to the relay open position.

19. The relay as defined in claim 18, further comprising:

a third sealing means for continued sealing engagement with the interior body surface while the valve stem moves between the relay open and relay closed positions.

20. The relay as defined in claim 18, wherein the fluid passageway through the interior piston surface is a cylindrical passageway having a uniform diameter, and the first sealing means has a uniform cross-sectional diameter which is greater than the uniform diameter of the fluid passageway through the interior piston surface.

* * * * *